United States Patent
Hatanaka

(10) Patent No.: US 6,308,513 B1
(45) Date of Patent: *Oct. 30, 2001

(54) TURBINE AND GAS TURBINE

(76) Inventor: Takefumi Hatanaka, 1-5-4 , Jindaiji, Mitakashi, Tokyo 181-0016 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,482

(22) Filed: May 3, 1999

(51) Int. Cl.[7] .................. F02G 3/00; F02G 5/00
(52) U.S. Cl. ............................................. 60/39.75
(58) Field of Search .................. 60/39.36, 39.162, 60/39.55, 39.511, 39.75

(56) References Cited

U.S. PATENT DOCUMENTS

| | | | |
|---|---|---|---|
| 3,818,696 | * | 6/1974 | Beaufrere ........................ 60/39.51 |
| 4,809,498 | * | 3/1989 | Giffin ............................ 60/39.162 |
| 5,611,197 | * | 3/1997 | Bunker ........................... 60/39.75 |
| 5,628,182 | * | 5/1997 | Mowill ........................... 60/39.36 |
| 5,791,136 | * | 8/1998 | Ultamura et al. ............... 60/39.182 |
| 6,202,782 | * | 3/2001 | Hatanaka ........................ 180/301 |

* cited by examiner

Primary Examiner—Timothy S. Thorpe
Assistant Examiner—W. Rodriguez
(74) Attorney, Agent, or Firm—Jordan and Hamburg LLP

(57) ABSTRACT

A turbine and gas turbine comprise an annular stator and a turbine rotor rotatably disposed in the stator. The stator includes a tangential inlet to introduce a jet stream of motive gases in a tangential direction, an outlet to exhaust expanded gases, and a plurality of circumferentially spaced and radially extending flow deflectors. The turbine rotor includes an annular jet stream path communicating with the inlet and the outlet, and a plurality of turbine blades circumferentially spaced in close proximity with the annular jet stream path, which accommodates the flow detectors to deflect the jet stream toward the turbine blades.

15 Claims, 4 Drawing Sheets

TURBINE AND GAS TURBINE

BACKGROUND OF THE INVENTION

1. Field of the Invention

The present invention relates to turbines and gas turbines.

2. Description of the Related Art

U.S. Pat. Nos. 5,385,446 and 5,624,235 disclose steam turbines and U.S. Pat. Nos. 5,611,197 and 5,791,136 disclose gas turbines. In these conventional turbines and gas turbines, turbines are usually composed of multi-stage stator vanes and multi-stage turbine blades. Each of turbine blades normally has a convex outer surface and a concave inner surface upon which motive gases impinge to produce a positive torque. In this instance, since the outer surface of each blade impinges upon the motive gases axially flowing through the turbine, a reactive force (i.e., a negative torque) is produced in a rotational direction of the turbine blades and, thus, an output shaft has an output power which is a result of the positive and negative torques. In these turbine structures, further, since the turbine rotor rotates at an extremely high speed, the motive gases tend to rotate with the turbine blades in a unitary fashion so that a huge centrifugal force and a fluidic wall are produced in a space between a turbine housing and the turbine rotor. Under these circumstances, the motive gases can not readily flow in the axial direction, thereby reducing the turbine efficiency. For this reason, the turbine and the gas turbine become large in structure, thereby increasing the manufacturing costs, while increasing the operation noises.

SUMMARY OF THE INVENTION

It is an object of the present invention to provide a turbine which is simple in structure, high in efficiency, low in operation noise and low in manufacturing cost.

It is another object of the present invention to provide a gas turbine which overcomes the shortcomings encountered in prior art.

It is another object of the present invention to provide a micro-gas turbine generator of a co-generation type.

DESCRIPTION OF THE PREFERRED EMBODIMENTS

Figure 1:
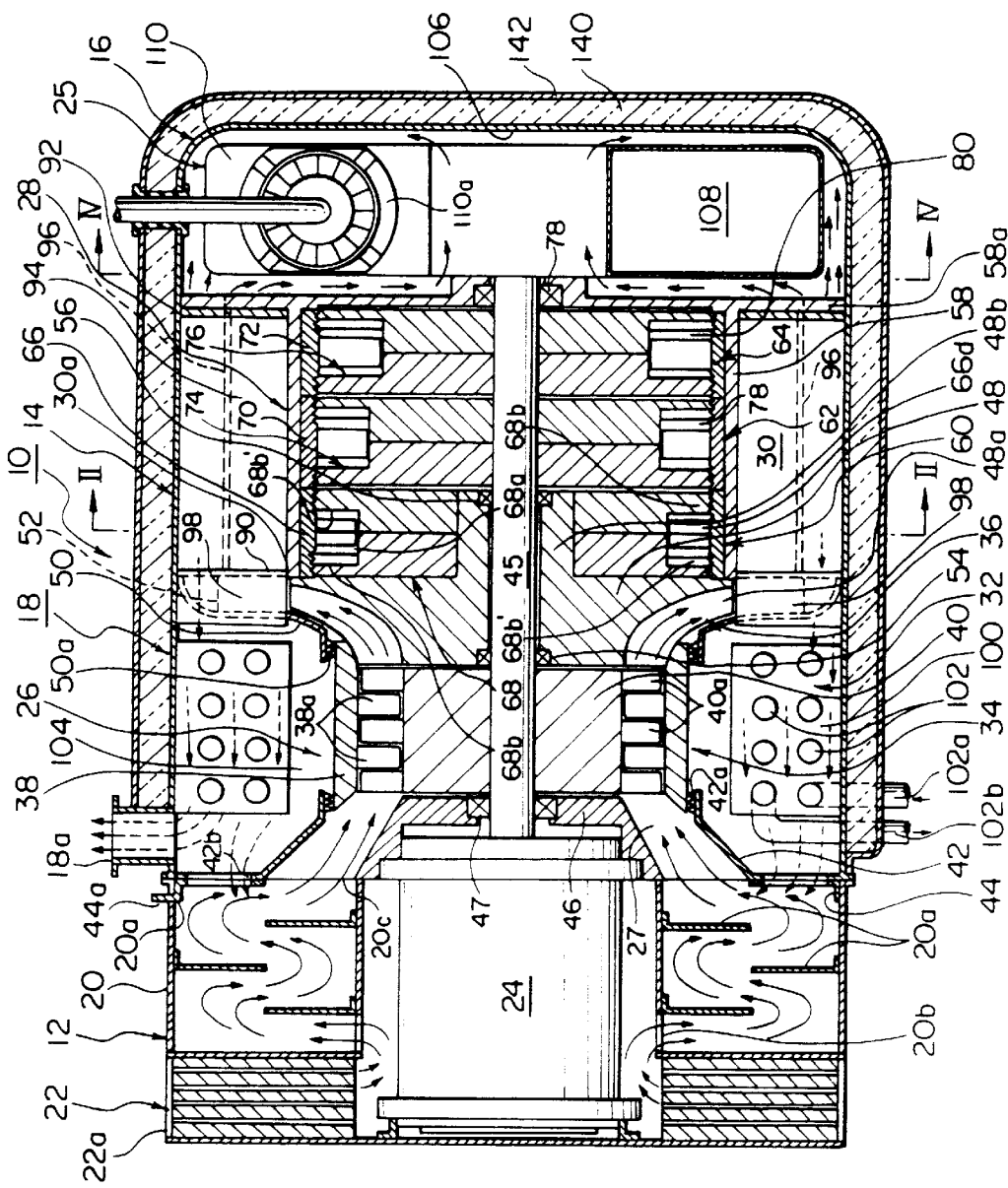
FIG. 1 is a cross sectional view of a preferred embodiment of a micro-gas turbine generator according to the present invention.
Figure 2:
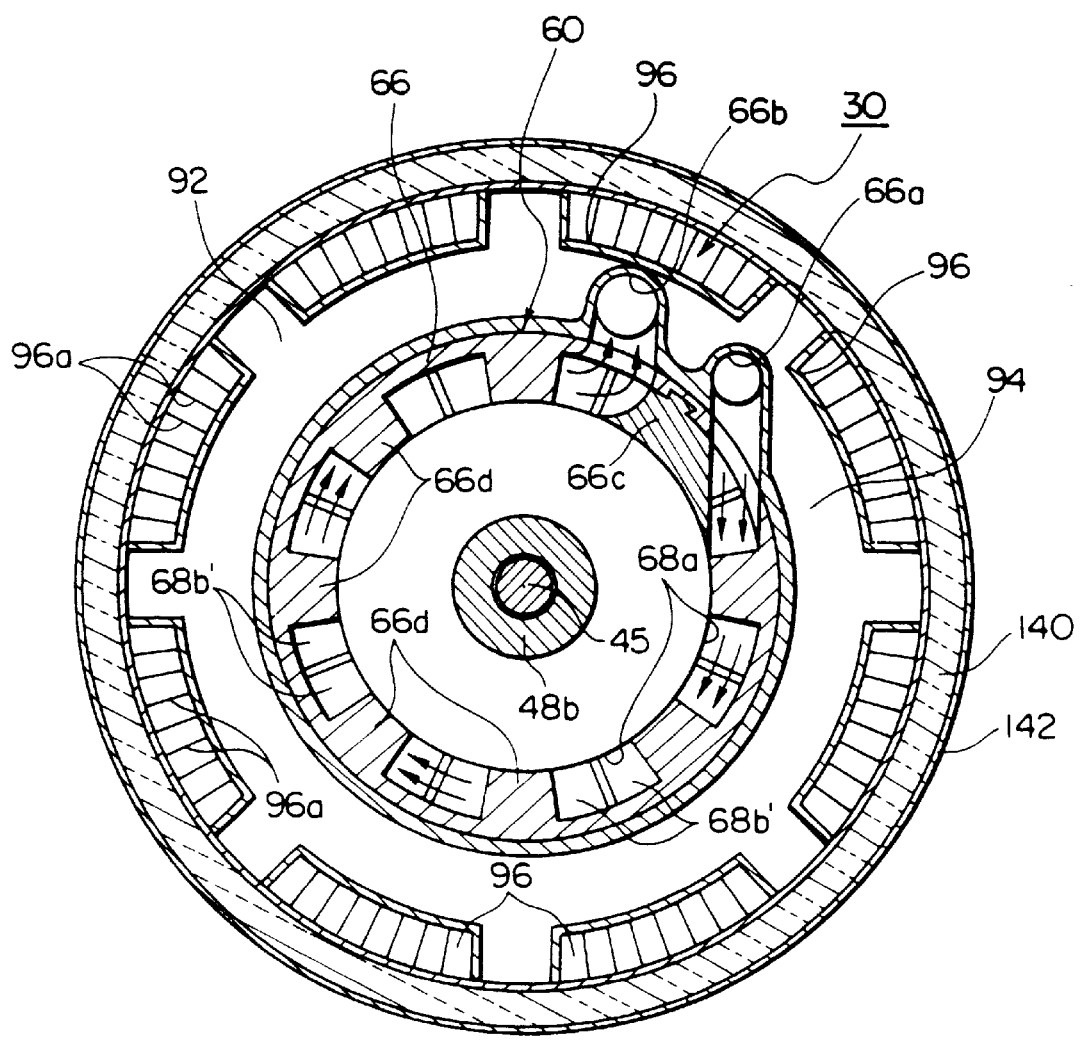
FIG. 2 is a cross section taken along line II—II of FIG. 1.
Figure 3:
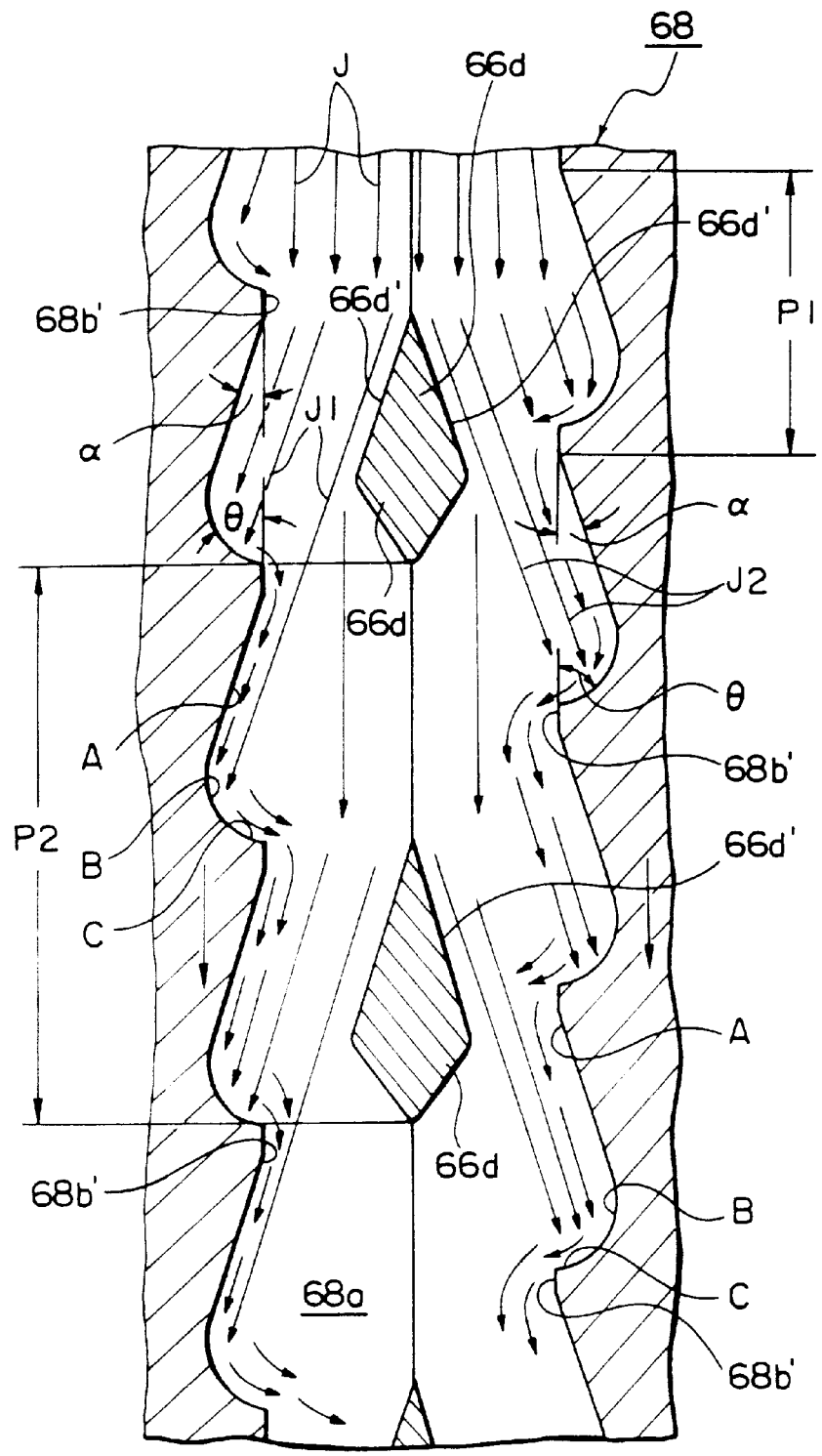
FIG. 3 is a schematic view showing the relationship between a stator and a turbine rotor of FIG. 1.

Referring now to FIGS. 1 to 3, there is shown a preferred embodiment of high efficiency micro-gas turbine generator 10 according to the present invention. Gas turbine generator 10 comprises turbine housing 18 having a front section 12, intermediate section 14 and rear section 16 which are aligned in a concentrical fashion. Front section 12 has annular silensor 20 and annular air filter 22. Annular silensor 20 has a plurality of ring-shaped partition walls 20a. Air filter 22 has a plurality of intake air openings 22a to allow intake air to flow through silensor 20. Silensor 20 has pluralities of inlets 20b and outlets 20c. Silensor 20 incorporates therein electric power generator 24. Combustor 25 is mounted at rear section 16 of turbine housing 18, and compressor 26 and turbine 28 are mounted at intermediate section 14. First annular heat recovery unit 30 is mounted in a space between turbine housing 18 and turbine 28. Second annular heat recovery unit 32 is mounted in a space between turbine housing 18 and compressor 26.

As seen in FIG. 1, compressor 26 has opening 27 communicating with outlet 20c, and comprises first-stage compressor 34 and second-stage compressor 36. First-stage compressor 34 includes rotary stator 38 having a plurality of stator vanes 38a, and compressor rotor 40 having a plurality of blades 40a. Compressor 26 has skirt section 42 extending adjacent opening 27 and coupled to turbine housing 18. Skirt section 42 is provided with labyrinth seal 42a which surrounds rotary stator 38, and has a plurality of exhaust gas recirculation holes 42b. Throttle 44 is accommodated in silensor 20 and rotatable to adjust the opening degree of holes 42b. Throttle 44 has its periphery formed with tang 44a which protrudes outward through recess 20a. Cone-shaped wall 46 is supported by silensor 20 and carries bearing 47 to support one end of output shaft 45.

Second-stage compressor 36 is connected to rotary stator 38 and functions to further compress the compressed air coming from first stage compressor 26. To this end, compressor 36 comprises compressor rotor 48 having radial blade 48a to force the compressed air to first heat recovery unit 30. Compressor rotor 48 has hub portion 48a, through which output shaft 45 extends. Compressor rotor 48 is rotatably supported by bearings 54, 56 on output shaft 45. Shroud 50 is carried by turbine housing 18 and has labyrinth seal 50a which is placed in close proximity with rotary stator 38. Diffuser 52 is placed within shroud 50.

As shown in FIGS. 1 and 2, turbine housing 20 includes inner housing 58 having its one end formed with flange 58a supported within turbine housing 18 and having its another end supported by inner wall 30a of heat recovery unit 30. Inner housing 58 and flange 58a may be united with turbine housing 18. Turbine 28 comprises first, second and third turbine components 60, 62 and 64. First turbine component 60 comprises annular stator 66 fixedly supported in inner housing 58, and turbine rotor 68 rotatably disposed in annular stator 66. Annular stator 66 has inlet 66a extending in a tangential direction to introduce a jet stream of motive gases emitted from combustor 25, outlet 66b to exhaust expanded gases, interruptor or partition member 66c, and a plurality of flow deflectors 66d formed in circumferentially spaced relationship between inlet 66a and outlet 66b. Also, annular stator 66 has its both ends provided with labyrinth seals to provide a seal effect relative to turbine rotor 68. Turbine rotor 68 is fixed to hub 48b of compressor rotor 48 by some suitable means.

Turbine rotor 68 comprises a pair of rotor disks having annular jet stream path 68a communicating with inlet 66a and outlet 66b to allow the jet stream of the motive gases in a circumferential direction. Flow deflectors 66d radially inwardly extend in annular jet stream path 68a. Turbine rotor 68 has a pair of annular walls 68b radially extending adjacent annular jet stream path 68a and having their outer peripheries held in close proximity with labyrinth seals. Each of annular walls 68b has a plurality of turbine blades 68b' formed in circumferentially spaced relationship and facing annular jet stream path 68a.

As shown in FIG. 3, turbine blades 68b' are offset from each other at both sides by half pitch in circumferential direction to effect smooth rotation of turbine rotor 68. Turbine blades 68b' have a pitch P1 which is equal to half value of pitch P2 of flow deflectors 66d. The relationship between pitches P1 and P2 may be modified. Each turbine blade 68*b*' has first edge A slanted at angle a relative to annular jet stream path 68*a* and extending parallel to guide surface 66*d*' of flow deflector 66*d*, intermediate surface B contiguous with first edge A and functioning as working surface upon which jet stream J1 or J2 impinge to apply a drive force to turbine rotor 68, and second edge C intersecting annular jet stream path 68*a* at angle θ to cause expanded gases in each turbine blade 68*b*' to emit therefrom and join main jet stream J passing through annular jet stream path 68*a*. Main jet stream J is divided by flow deflectors 66*d*' into jet streams J1 and J2 which successively impinge upon turbine blades 68*b*' without reduction in mass flow of main jet stream J to increase turbine efficiency.

Turning now to FIG. 1, second and third turbine components 62, 64 have annular stators 70, 72, respectively, which are fixedly supported in inner housing 58, and turbine rotors 74, 76 rotatably disposed in annular stators 70, 72, respectively. Both of annular stators 70, 72 have inlets to form jet streams in a direction opposite that of inlet 66*a* of first turbine means 60, and outlets for exhausting expanded gases. The inlet of second turbine 62 is connected to outlet 66*b* of first turbine means 60, and the outlet of second turbine 62 is connected to the inlet of third turbine means 64. The outlet of third turbine means 64 is open to an innerside of first heat recovery unit 30. As shown in FIG. 1, first, second and third turbine means 60, 62, 64 have annular jet stream paths 68*a*, 78, 80, respectively, which have sequentially increased cross sections to effect sequential expansions of the motive gases. Thus, first turbine rotor 68 is caused to rotate clockwise, while second and third turbine components 62, 64 rotate counter-clockwise. To this end, annular stators 70, 72 have their flow deflectors positioned in a direction opposite that of first turbine components 60. Also, turbine rotors 74, 76 have their turbine blades positioned in a direction opposite to that of first turbine components 60. Thus, second and third turbine components 62, 64 are fixed to output shaft 45. Output shaft 45 has its right end supported by bearing 78 mounted in flange 58*a* of inner housing 58.

In FIGS. 1 and 3, first annular heat recovery unit 30 includes annular walls 90, 92 disposed in an annular space defined between turbine housing 18 and inner housing 58, annular chamber 94, a plurality of compressed air heating passages 96 circumferentially spaced at a periphery of annular chamber 94, and a plurality of exhaust ports 98 formed between heating passages 96 and opening toward second annular heat recovery unit 32. Heating passages 96 communicates with shroud 50, and each has a plurality of heating fins 96*a* to preheat the compressed air. As discussed above, the outlet of third turbine 64 is open to annular chamber 94, which recovers heat from the expanded gases emitted from third turbine 64. The expanded gases are then exhausted from exhaust ports 98 to second heat recovery unit 32.

In FIG. 1, second heat recovery unit 32 comprises a plurality of heating fins 100 and a heating coil 102 having an inlet 102*a* and an outlet 102*b* to obtain a hot water. In this instance, the expanded gases emitting from exhaust ports 98 are cooled in exhaust gas recirculation chamber 104 by heat recovery unit 32. Then, the exhaust gases are recirculated in part to silensor 12 via exhaust gas recirculation port 42*b* defined at skirt portion 42, and remaining part of the exhaust gases are emitted to atmosphere via exhaust pipe 18*a*.

Figure 4:
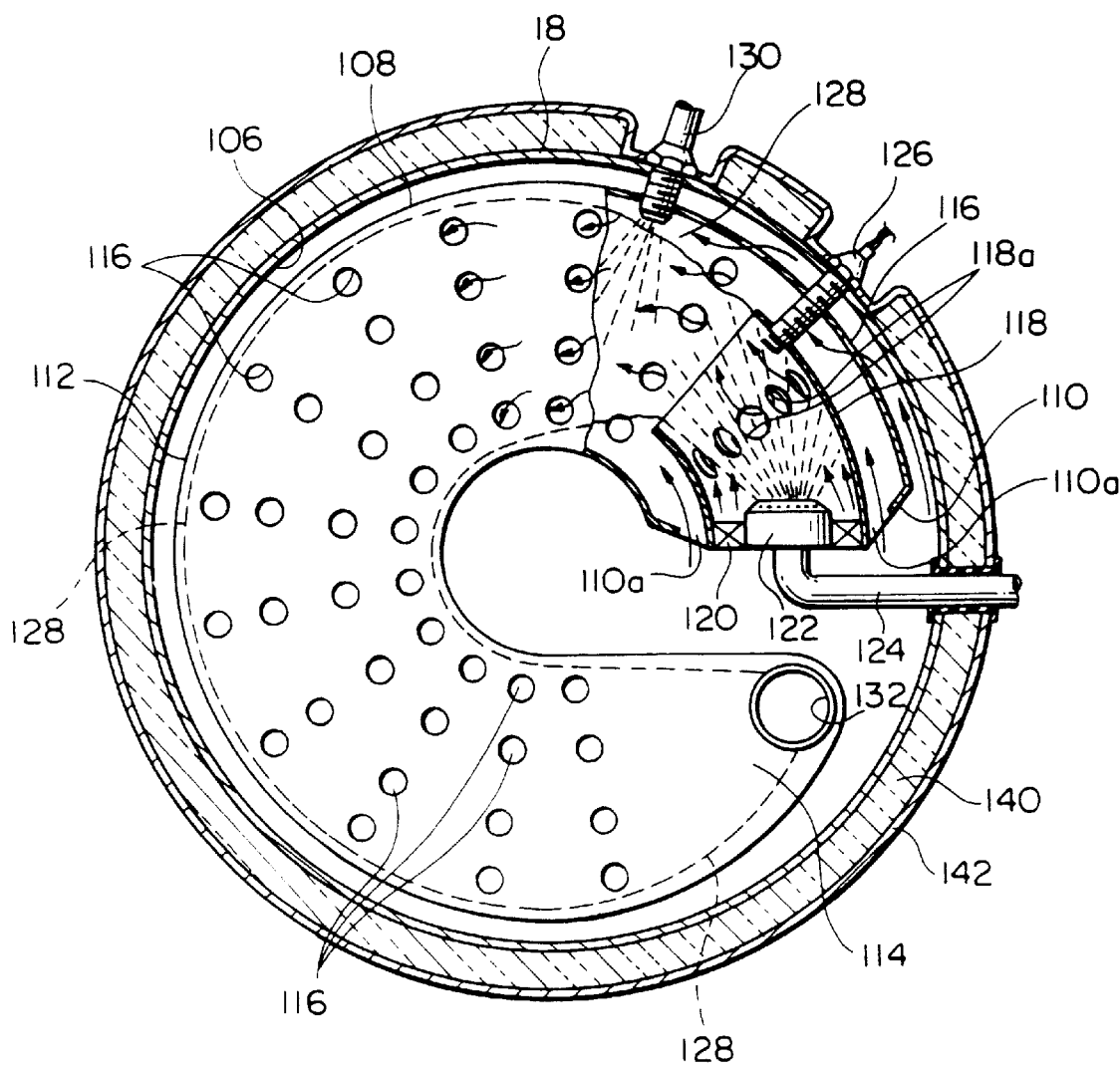
FIG. 4 is a cross section taken on line IV—IV of FIG. 1.

In FIGS. 1 and 4, combustor 25 comprises combustion chamber 108 defined by substantially semi-circular liner mounted in circular chamber 106 formed at rear section 16 of turbine housing 18. The combustion chamber 108 has leading section 110, intermediate section 112, trailing section 114, and a plurality of air holes 116 formed in each section. The leading section 110 incorporates therein pre-evaporation and pre-mixing duct 118, and fuel nozzle 122 and swirler 120 are mounted in duct 118. Fuel nozzle 122 is connected via fuel pipe 124 to a fuel tank for natural gases, diesel oil and petroleum etc. Duct 118 has a plurality of air holes 118*a* to admit preheated compressed air thereinto, and the preheated compressed air is further introduced into duct 118 and leading section of combustion chamber 108 through swirler 120 and an opening 110*a*. Liquid fuel is injected toward an inner wall of duct 118 by fuel nozzle 122 to form fine fuel droplets or particles which are evaporated by preheated air and heated duct 118 to form a uniform air-fuel mixture, which is ignited by ignition plug 126. The compressed air preheated by first heat recovery unit 30 is further heated by liner 112, and heated air functions to evaporate the fuel droplets while lowering the combustion temperature in the combustion chamber 108 to reduce NOx components. Duct 118 serves to effect formation of lean air-fuel mixture which is uniformly mixed with compressed air, thereby achieving reduction in HC, CO contents in motive gases. Nozzle 130 is mounted at leading section 110 downstream of duct 118 to effect water injection or vapor injection to further reduce NOx contents. Intermediate section 112 has a relatively long distance for combustion region, and, so, the air-fuel mixture is completely burnt. The motive gases containing less pollutants are expelled from exit 132 and injected to first turbine 60. In FIG. 1, turbine housing 18 is provided with heat insulation material 140, which is covered by outer cover 142.

With the constitution discussed above, intake air passing through air filter is brought into contact with an outer surface of generator 24, which is cooled. Then, the intake air passes through silensor 20 into compressor 26. The intake air is compressed by first and second stage compressors 34, 36. Since the first stage compressor 34 compresses the intake air by counter-rotating rotary stators 38 and compressor rotor 40 and the second compressor 36 further compresses the compressed air at second stage, highly compressed air having an extremely high compression ratio is obtained for increasing turbine performance without sacrificing size, weight as well as other factors of the turbine. The compressed air is then preheated by first heat recovery unit 30 and enters circular chamber 106, in which the compressed air is further preheated by surface of combaster 25 in contact therewith. Then, the compressed air enters into duct 118 via swirler 120 and into leading section of combustion chamber 108 via opening 110*a*. Fuel droplets injected by fuel nozzle 122 is evaporated by pre-mixing duct 118 and preheated compressed air to produce uniform air-fuel mixture, which is ignited by ignition plug 126 to form flame 128. Water or steam is injected into flame 128 by nozzle 126, thereby increasing mass of combustion products as the motive gases. Water or steam functions to reduce the combustion temperature, thereby decreasing the NOx contents in the combustion products. The motive gases are emitted from exit 132 and introduced into first turbine component 60 via its inlet 66*a*, thereby driving rotary stator 38 and compressor rotor 48 clockwise (see FIGS. 2 and 3). The expanded motive gases emitting from first turbine component 60 enters second and third turbine component 62, 64, which are driven counter-clockwise to drive generator 24 and compressor rotor 40 counter-clockwise. Finally expanded gases are exhausted from third turbine component 64 to annular chamber 94 of first heat recovery unit 30, by which the compressed air is preheated while the temperature of the expanded gases is lowered. The expanded gases are then passed to second heat recovery unit 32 by which the hot water is obtained while the temperature of the expanded gases is further lowered. The expanded gases thus lowered in temperature is partly recirculated to gas turbine 10 and exhausted to atmosphere via exhaust pipe 18a, thereby eliminating the pollutants in the exhaust gases.

It will now be understood that the turbine or the gas turbine have high efficiency, simple structure, light weight, long life and low cost, with the exhaust gases containing extremely less pollutants. Further, it is possible to provide a micro-gas turbine generator of cogeneration type having wide applications from home uses to industrial uses.

What is claimed is:

1. A gas turbine comprising:

a compressor for introducing compressed air;

a turbine having an output shaft for driving said compressor; and a combustor for combusting compressed air and fuel to produce motive gases to drive said turbine;

said turbine including an inlet to introduce a jet stream of said motive gases in a tangential direction, an outlet for exhausting expanded gases, a stator having at least one flow deflector extending radially inward at a position between said inlet and said outlet, and a turbine rotor rotatably received in said stator, said turbine rotor having an annular jet stream path communicating with said inlet and said outlet to allow said jet stream to run in a circumferential direction, and a plurality of turbine blades formed around a periphery of said turbine rotor in close proximity with said annular jet stream path, and said flow deflector being disposed in said annular jet stream path to deflect said jet stream toward said turbine blades.

2. The gas turbine according to claim 1, further comprising a first heat recovery unit for heat recovery of said expanded gases to preheat compressed air produced by said compressor.

3. The gas turbine according to claim 2, further comprising a second heat recovery unit for producing heated water upon heat recovery of said expanded gases exhausted from said first heat recovery unit.

4. The gas turbine according to claim 3, further comprising an exhaust gas recirculation unit for recirculating a portion of said expanded gases to said compressor.

5. The gas turbine according to claim 1, in which said combustor comprises a combustion chamber having an entrance, a pre-evaporation and pre-mixing duct mounted at said entrance, and a fuel nozzle mounted in said duct.

6. A gas turbine comprising:

a turbine housing having front, intermediate and rear sections;

a compressor mounted in said intermediate section to produce compressed air;

a combustor mounted in said rear section for combusting said compressed air and fuel to produce motive gases;

a turbine located in said intermediate section between said compressor and said combustor and driven by said motive gases; and an output shaft connected to said turbine;

said turbine including an inlet to introduce a jet stream of said motive gases in a tangential direction, an outlet for exhausting expanded gases, a stator having at least one flow deflector extending radially inward at a position between said inlet and said outlet, and a turbine rotor rotatably received in said stator, said turbine rotor having an annular jet stream path communicating with said inlet and said outlet to allow said jet stream to run in a circumferential direction, and a plurality of turbine blades formed around a periphery of said turbine rotor in close proximity with said annular jet stream path, and said flow deflector being disposed in said annular jet stream path to deflect said jet stream toward said turbine blades.

7. The gas turbine according to claim 6, in which said compressor comprises a first stage compressor composed of a rotary stator and a compressor rotor which are rotatable in opposite directions, and in which said turbine comprises a first turbine rotor coupled to said rotary stator and a second turbine rotor coupled to said compressor rotor.

8. The gas turbine according to claim 7, in which said compressor further comprises a second stage compressor coupled to said rotary stator.

9. The gas turbine according to claim 6, further comprising a first annular heat recovery unit disposed in a space between said turbine housing and said turbine to preheat said compressed air upon heat recovery of said expanded gases.

10. The gas turbine according to claim 9, further comprising a second annular heat recovery unit disposed in a space between said turbine housing and said compressor for producing heated water upon heat recovery of said expanded gases emitted from said first heat recovery unit.

11. The gas turbine according to claim 6, further comprising a silensor mounted in said front section of said turbine housing to allow intake air to flow to said compressor.

12. The gas turbine according to claim 6, in which said combustor comprises a substantially semicircular combustion chamber formed in the rear section of said turbine housing, a pre-evaporation and premixing duct mounted in said combustor chamber, and a fuel nozzle mounted in said duct.

13. The gas turbine according to claim 12, in which said combustor further comprises a water injection nozzle mounted downstream of said duct.

14. The gas turbine according to claim 6, further comprising exhaust gas recirculation unit formed in said turbine housing to allow a portion of said expanded gases to be recirculated to said compressor.

15. The gas turbine according to claim 6, further comprising an inner housing extending concentrically with said turbine housing to incorporate therein said turbine.

* * * * *